June 22, 1937.  A. F. LÈBRE  2,084,691
PROCESS OF AND APPARATUS FOR PERFORMING THERMAL CONVERSIONS
Filed May 18, 1934  3 Sheets-Sheet 1
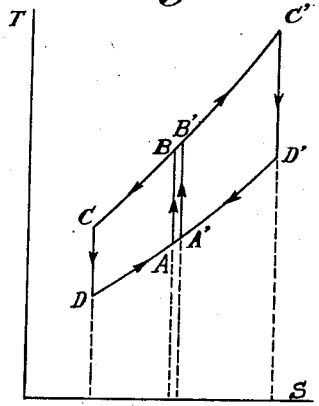
Fig. 1.
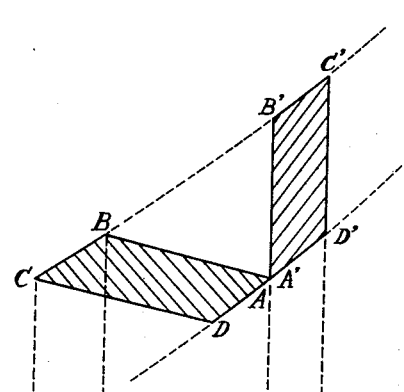
Fig. 6.
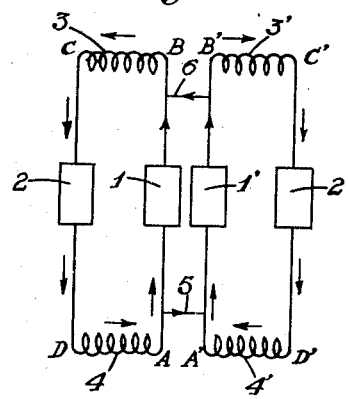
Fig. 2.
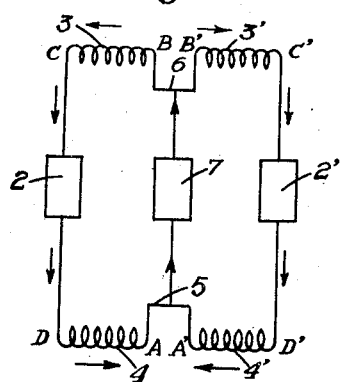
Fig. 3.
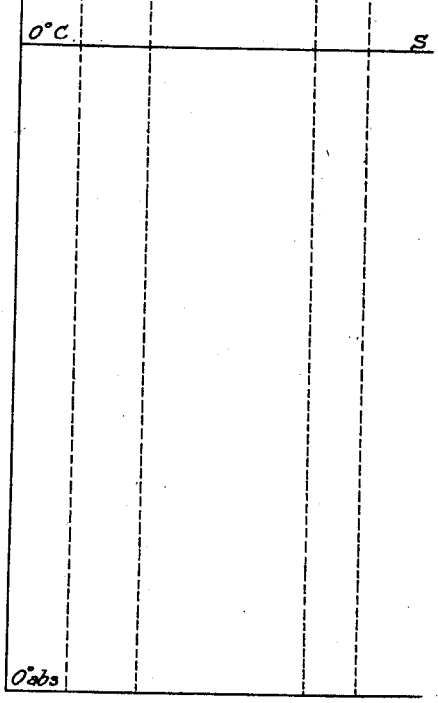
INVENTOR
ALBERT FRANÇOIS LEBRE
BY Wm. M. Cady
ATTORNEY June 22, 1937.  A. F. LÈBRE  2,084,691

PROCESS OF AND APPARATUS FOR PERFORMING THERMAL CONVERSIONS

Filed May 18, 1934   3 Sheets-Sheet 2

INVENTOR
ALBERT FRANÇOIS LEBRE
BY *Wm. W. Cady*
ATTORNEY

June 22, 1937. A. F. LÈBRE 2,084,691
PROCESS OF AND APPARATUS FOR PERFORMING THERMAL CONVERSIONS
Filed May 18, 1934   3 Sheets-Sheet 3

INVENTOR
ALBERT FRANÇOIS LEBRE
BY Wm. M. Cady
ATTORNEY

Patented June 22, 1937

2,084,691

UNITED STATES PATENT OFFICE 2,084,691

PROCESS OF AND APPARATUS FOR PERFORMING THERMAL CONVERSIONS

Albert François Lèbre, Paris, France

Application May 18, 1934, Serial No. 726,310. In France June 8, 1933

21 Claims. (Cl. 62—170)

The present invention relates to processes for converting heat into cold and for converting a given quantity of heat energy at a high temperature into a larger quantity of heat energy at a lower temperature.

When gases are employed as working fluids in a refrigerating machine or in a heat pump, use is made of cycles comprising compression, release of heat at a constant and relatively high pressure, expansion, and absorption of heat at a constant and relatively low pressure. It is known that the amount of energy absorbed in such cycles is equal to the difference between the energy supplied for the compression of the gas and the energy recovered by the expansion of the gas; said difference being due to the contraction of the gas under high pressure subjected to cooling or to the expansion of the gas under low pressure subjected to heating, and also to gas leakages. The absorbed energy is usually supplied in mechanical form by a suitable motor.

The object of the present invention is to dispense with said motor and substitute therefor a supply of thermal energy, under such conditions that it is directly available for use, thereby avoiding the losses due to the use of mechanical apparatus as well as the practical complications implied thereby. Some of the applications of my invention allow use to be made of a source of heat energy instead of a source of mechanical energy for the purpose of producing cold, while obtaining a greater efficiency than with other known processes, such as those employed in absorption refrigerating machines for instance, a further advantage of the invention being the possibility of using air only, as working fluid.

Another object of the present invention is to utilize a small quantity of heat units at high temperatures to render available a larger quantity of heat units or of cold units at relatively low temperature, i. e. so to speak, to provide means acting relatively to heat somewhat as does the electric transformer relatively to electricity.

Another object of my invention is to render available for useful purposes, as for producing cold for example, sources of heat at relatively low temperatures, which cannot be used in practice by the usual processes, for instance waste combustion gases the temperature of which has fallen to 100–200° C.

In one method of carrying out the process according to my invention, the hot gases (combustion gases) are not sent through heat exchangers, but are circulated directly in the output part of the cycle, which obviously is still more advantageous. According to the invention this is feasible when the highest pressure in the cycle is atmospheric, the lowest pressure being obtained by the expansion of the warm gases, which are subsequently cooled and then brought back to atmospheric pressure and kept by suction in an input circuit under reduced pressure through the stages of expansion, reheating, and recompression. The output circuit is then closed through the chimney from which the hot gases are drawn while the input circuit of the cycle is completed through the atmosphere. Under such conditions the mingling of gases between the output and the input portions of the cycle can take place so as to avoid ingress into the input portion of the cycle of gases from the output portion which would be liable to soil the gases in said input portion.

In the accompanying drawings I have illustrated diagrammatically the phenomena involved in carrying out the invention, as well as various arrangements and apparatus suitable for use in performing the invention; said apparatus and arrangements being illustrated merely by way of example.

Fig. 1 is an entropic diagram showing the input portion and the output portion of a cycle according to the invention represented side by side.

Figs. 2 and 3 illustrate diagrammatically arrangements of circuits suitable for carrying out the operations represented by the diagram.

Figs. 6 and 7 are other entropic diagrams.

Figure 4:
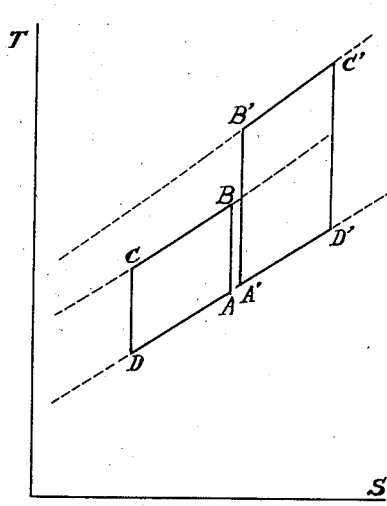
Fig. 4 is another diagram and Fig. 5 a view of the corresponding circuits.

Broadly stated the invention consists in combining with the operations of cycles which absorb energy in the form of gases under increased or reduced pressure, herein called "input cycles", a series of similar but reverse operations performed with other quantities of gas so as to produce a driving effect, i. e. operations constituting a so-called "output cycle" in which heat is converted into energy also in the form of gases under increased or reduced pressure.

In other words, according to my invention, besides the variation in gas volume which, in the first series of operations, is a necessary consequence of the desired thermal effect and implies absorption of energy, I produce, by a second series of operations, a reverse thermal effect giving rise to a variation in gas volume capable of giving out energy, and I make use of such second variation of volume for the purpose of compensating said first variation. To this end I provide, between the two circuits in which reverse operations are being carried out, a connection forming a path for a current hereinafter called "compensating current" so that the two circuits form together a closed cycle in which a constant quantity of gas is circulated.

The compensating current can be created in a simple manner by connecting with each other constant pressure heat exchangers in each of the two circuits, if said circuits are operated under like differences of pressure. Said current can also be sent through a machine adapted to develop or to absorb a pressure difference if it is necessary to equalize the gas pressure between the two circuits. In either case the work of compression and the work of expansion are made equal in each of the two circuits, and the mechanical energy which is transmitted from one circuit to the other or is supplied from outside, only amounts to that required to compensate friction losses. Said energy can be provided by an excess of energy in the "output" part of the cycle, either in the form of an excess of compressed gas or by a greater pressure difference in the "output" part than in the "input" part of the cycle.

The entropic diagram of Fig. 1 relates to an embodiment of the invention in which compressions and expansions are carried out adiabatically in both series of operations.

ABCD represents the input portion of the cycle which comprises the operations carried out in refrigerating machines or in heat pumps comprising the following stages: AB, adiabatic compression of the gas; BC, cooling at constant pressure; CD, adiabatic expansion; DA, reheating at constant pressure at the expense of the surrounding medium, i. e. production of cold units.

Simultaneously with these operations I also carry out a reverse series of operations (output portions of the cycle) as follows: A'B', adiabatic compression; B'C', heating at constant pressure by means of a source of heat; C'D', adiabatic expansion; D'A', cooling at constant pressure.

While circulating through the stages represented by ABCD the gas is subjected during the heating stage DA to an increase in volume which would have to be compensated by expenditure of mechanical energy if the circuit in which the gas circulates were closed upon itself. Likewise the gas circulating through the stages represented by A'B'C'D' is subjected to a decrease in volume during the cooling stage D'A'. According to the present invention the increase in volume occurring in the first series of operations is compensated by the decrease occurring in the second series, said compensation being obtained by creating a connection between the two circuits at the points A and A'. Likewise a connection created between points B and B' allows for compensation of the decrease in gaseous volume, occurring in the input circuit during the cooling stage BC, by means of the increase in volume which takes place between B' and C'.

Such an arrangement is shown in Fig. 2 in which 1 and 1' are compressors, 2 and 2' are pressure reducers, 3, 3' and 4, 4' are heat exchangers. Connections 5, 6, are provided between the two circuits before and after the compressors 1, 1' in order to provide a passage for the gaseous current which is to compensate the respective variations of volume during the stage under pressure, the excess of gas passing from the input circuit into the output circuit through 5 and returning to the input circuit through the connection 6. A compensating current or "volume exchange" current of constant direction is thus circulated through 5 and 6, thereby dispensing with the substantial amount of work which would otherwise have to be spent for the purpose of compensating the variations of volume produced successively in the heating and cooling stages of the input circuit.

Although I have here shown two compressors, two pressure reducers and four heat exchangers, it may be possible to combine together all or some of the compressors, pressure reducers or heat exchangers, as will be shown hereafter.

The withdrawal of gas from one circuit and its introduction into the other circuit may be effected before or after the heat exchangers at points where the temperature difference is as small as possible so as not to disturb the thermal effect of the cycle. For instance, the total quantity of gas to be treated may be compressed and then divided into two portions of which the larger portion is led to a heat exchanger where it is cooled while the smaller portion is led to an exchanger where it is heated, so that the respective volumes of said portions have varied inversely after their passage through said exchangers, thus allowing a separate expansion of the two quantities of gas.

Fig. 3 shows diagrammatically an embodiment of the invention wherein use is made of one compressor only.

It is further possible, and in some cases advantageous, to maintain unequal differences of pressure in the output portion and in the input portion of the cycle. Fig. 4 is an entropic diagram, similar to Fig. 1 but having a greater pressure difference in the output portion A'B'C'D' than in the input portion ABCD of the cycle.

Figure 5:
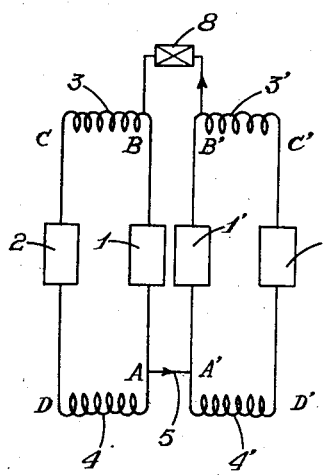

In this case, the connection between the high pressure exchangers of the two circuits, as illustrated in Fig. 5, includes a pressure reducer 8 in which the expansion of the gaseous current circulating from the output circuit to the input circuit produces energy which may be recovered and used for the purpose of compensating the losses of energy caused by friction of the moving members for instance.

In a form of the invention which is of particular advantage as regards the efficiency of the thermal conversions, the compressions and expansions of the output portion of the cycle are effected adiabatically whereas the corresponding operations in the input portion of the cycle are kept closer to the isotherm. This makes it possible on the one hand to render the output portion of the cycle more suitable for the production of gas under pressure with the smallest possible absorption of energy, and on the other hand to suit the input portion of the cycle to utilize gas under pressure so as to obtain the largest possible thermal effect, as will be explained hereafter.

Fig. 6 is an entropic diagram illustrating an embodiment of the invention in which the output portion A'B'C'D' of the cycle comprises the same operations as in the previous examples, compression and expansion being adiabatic, whereas the input portion ABCD is so performed that the compression AB and expansion CD are almost isothermal. The advantage of such a method of proceeding will be apparent from the following considerations:

It is well known that in an entropic diagram the quantity of heat transferred to or from the surrounding medium is measured by the respective areas underlying the curves which represent these operations, whereas the amounts of energy delivered or absorbed are represented by the areas comprised within the lines defining each series of operations. In the cycle illustrated in Fig. 1, the quantity of heat taken from the heat supply is measured by the area lying under line B'C' (that is to say the area between the curve B'C', the two vertical lines drawn through B' and C' respectively and the base line or line of abscissae which corresponds to the absolute zero) while the quantity of heat taken from the surrounding medium, in other words the production of cold units, is represented by the area underlying the curve DA. The energy absorbed is represented by the area ABCD, and the energy delivered by the area A'B'C'D', said second area being at least equal to the area of ABCD and preferably larger in order to take the losses into account.

In the case of Fig. 1, this last mentioned condition (A'B'C'D'≐ABCD) requires that for the various operations of the output portion of the cycle, the thermal effects (measured by the areas underlying the lines representing said operations) be at least of the same order of magnitude as the thermal effects corresponding to the operations in the input portion of the cycle. Indeed the areas ABCD and A'B'C'D' are very nearly equal and their ordinates being practically the same, their widths consequently are also of like size, thus implying substantially equal underlying areas. It follows that a heat unit can only produce at most nearly one cold unit or nearly two heat units at lower temperature.

On the other hand in the case illustrated in Fig. 6 it is obvious that the heat absorbed (curve B'C') may be small whilst the ratio between the heat taken from the surrounding medium (curves CD and DA) and the heat transferred to a higher thermal level (curves AB and BC), can be made as large as desired by sufficiently increasing the pressure difference for a given temperature difference in the input portion of the cycle. As the expenditure of energy in each portion of the cycle is represented by the corresponding shaded area, it is obvious, from the diagram of Fig. 6, that for an expenditure of energy of the same magnitude as that required in Fig. 1 for instance, the receiving portion of the cycle will provide much more considerable thermal effects, thus making possible to produce $n$ cold units or $n$ heat units from a single heat unit, the value of $n$ depending upon the ratio of the temperature differences.

Instead of operating, in the input part of the cycle, by means of isothermal compressions and expansions which are difficult to realize in practice, I have found that substantially the same advantages may be obtained by dividing the compressions and expansions into several stages with a heat exchange at each level and a compensation of the variation of gas volume by the setting up of gas currents between the exchangers in which reverse thermal operations take place.

Figure 7:
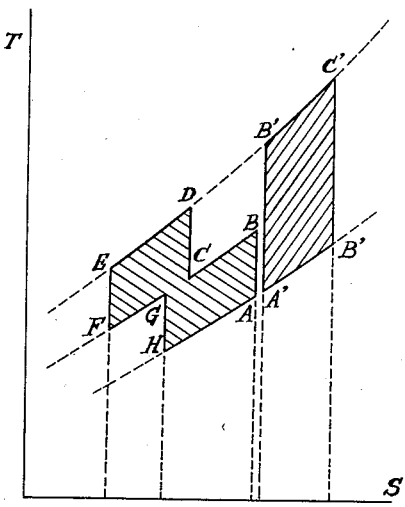

Fig. 7 illustrates the entropic diagram of a cycle according to my invention in which the input portion comprises two stages including the following operations: adiabatic compression AB, release of heat BC, second adiabatic compression CD, second release of heat DE, adiabatic expansion EF, production of cold FG, second adiabatic expansion GH, second production of cold HA.

The number of stages may obviously be increased as required without any difficulty. Whatever be the number of stages, the arrangement then is such that any variation of volume during a heat exchange is compensated by a reverse variation of volume during another heat exchange; the variation of volume during the cooling step BC for example being compensated by a reverse variation of volume during the heating step FG. Thus, the oppositely directed variations of volume in the successive stages of the input portion of the cycle are mutually compensated with exception of the last, i. e. the variation of volume at maximum pressure, which alone must be compensated by heat from an extraneous source, such heat being supplied in the step B'C'.

Figure 8:
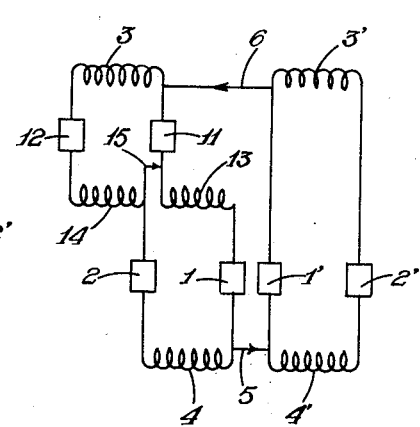
Fig. 8 shows an arrangement corresponding to the conditions illustrated in Fig. 7.

Fig. 8 illustrates a diagrammatic arrangement of apparatus suitable for carrying out the process described with reference to Fig. 7. Whilst the output circuit comprises the same elements as in Fig. 2, the input circuit comprises two stages of compressors 1, 11 and pressure reducers 2, 12, as well as intermediate heat exchangers 13, 14. As before, connections 5 and 6 are provided for the circulation of the compensating current between stages at the same pressure of the two circuits. An additional connection 15 is provided in the input circuit for the purpose of compensating the variations of volume occurring in the exchangers 13 and 14. If the number of stages is greater a connection similar to 15 is provided between the two exchangers at like pressure in each stage, thereby making it possible to reduce the exchange of gas volume with the output circuit to that required in the last pressure stage.

Figure 9:
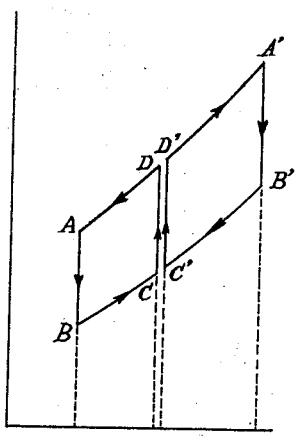
Fig. 9 is an entropic diagram and Fig. 10 is a circuit arrangement more specially designed for using waste gases.
Figure 10:
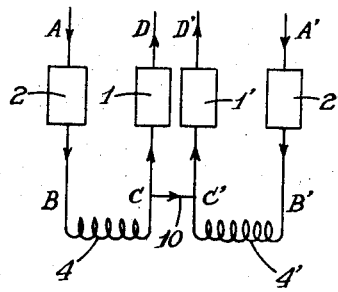

An important application of the process according to my invention is derived from the possibility of using as a source of thermal energy, gases at a temperature of about 100 or 200° C. such as waste combustion gases which are usually discarded as being of no value. The possibility of such use is due to the fact that the thermal operations carried out may correspond to differences of temperature of the same order, as a few dozen degrees, which in practice are sufficient for the purpose of producing cold. Fig. 9 is an entropic diagram similar to Fig. 1, except that the highest isobar corresponds to atmospheric pressure, in which case I may directly treat a hot gas such as waste combustion gases. The starting point of the output circuit of the cycle then is A', whence the warm gas, withdrawn from a chimney for instance, is expanded up to B', cooled up to C', then recompressed to escape into the atmosphere at D'. The input portion of the cycle comprises induction of atmospheric air at A, expansion AB, heating BC with consequent absorption of heat units from the surrounding medium, and finally a compression CD, the air being returned to the atmosphere at D. As the volume of air has increased from A to C whilst the volume of gas has decreased from A' to C', the points C and C' may be joined (Fig. 10) by a connection 10 in which a current will continuously flow from the input circuit towards the output circuit.

With the advantage derived from the direct use of waste gases, this arrangement combines a further advantage, in that the compensating current is fed with air from the input circuit, so that it dilutes the waste gases, but there is no return flow of waste gases whereby the air in the input circuit would be soiled.

The cycle illustrated in Fig. 9 as well as those of the previous diagrams may of course be carried out by operating in stages as explained above, with the use of any suitable compressors, pressure reducers or other apparatus.

A particularly advantageous manner of carrying out the cycles according to my invention consists in using, for effecting expansions and compressions, rotary apparatus of the type described in my co-pending patent application Serial No. 715,875, filed March 16, 1934, in which said operations are carried out by the mutual action of the gases undergoing compression and expansion, and without material partitions being interposed therebetween. The advantage derived from the use of these apparatus consists chiefly in that they provide a further step towards eliminating every transfer of mechanical energy. Whereas such transfer from the output circuit to the input circuit is already avoided by the combination of circuits according to my present invention, by using the aforesaid apparatus I am moreover enabled to eliminate transfer of energy from the pressure reducer to the compressor of each circuit.

The aforesaid apparatus usually comprise a rotor having a ring of chambers 16 (Fig. 11) mutually separated by radial partitions 17, in motion relatively to casing 18. During the course of a revolution each chamber passes in succession, through a zone AB in which the gas contained in said chamber is compressed and heated, through a zone BC in which said compressed and heated gas is discharged into a heat exchanger 3 and replaced by cooled gas at the same pressure issuing from said exchanger 3, through a zone CD in which said cooled gas is expanded and further cooled, and through a zone DA in which said expanded gas is discharged to be heated in a heat exchanger 4, thus cooling the surrounding air for instance, and is replaced in the chambers by a warmer gas at the same low pressure issuing from the exchanger 4.

These apparatus are so designed that the compressed gas to be expanded is caused to displace and compress the gas to be treated, by direct action, i. e. without interposition of mechanical parts.

To this end, the chambers containing the gas to be expanded, while moving through the arc CD, are connected, by means of a distributor comprising ducts such as 19, with the chambers containing the gas to be treated which follow the arc AB, in such manner that a gaseous current is set up between these two series of chambers while their pressures are nearly the same, this so-called pressure-exchange current ensuring the gradual decrease of pressure from C to D and the gradual increase of pressure from A to B, and being so guided that it is interposed in the manner of a gaseous partition between the two main gas currents.

Even if the apparatus were perfect, the gaseous current from the expanding portion to the compressed portion would not be sufficient for ensuring compression, because of the variations of volume to which the gas is subjected in the heat exchangers. The complementary gas is provided, according to my aforesaid patent application, Serial No. 715,875, by a compressor associated with the rotor for the purpose of varying the volume of the chambers during the constant pressure phases.

My present invention provides means which obviate the need of producing mechanical energy for the purpose of compensating the variations of gas volumes. If I effect the sequence of operations constituting the input portion of the cycle in an apparatus of the type described, and if moreover I effect in a similar apparatus the operations constituting the output portion of the cycle, I then can automatically create a gaseous compensation current by merely providing connections at points where the pressures and temperatures are nearly alike, between the constant pressure exchangers or conduits of the circuits in which reverse thermal operations, which produce reverse variations of volume, are carried out.

Figure 11:
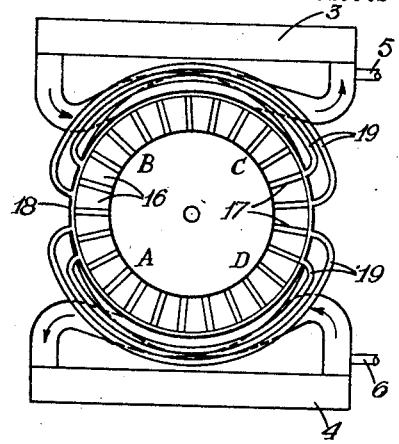
Fig. 11 shows a rotary apparatus acting as compressor and as pressure reducer, which is particularly suitable for carrying out my present invention.
Figure 12:
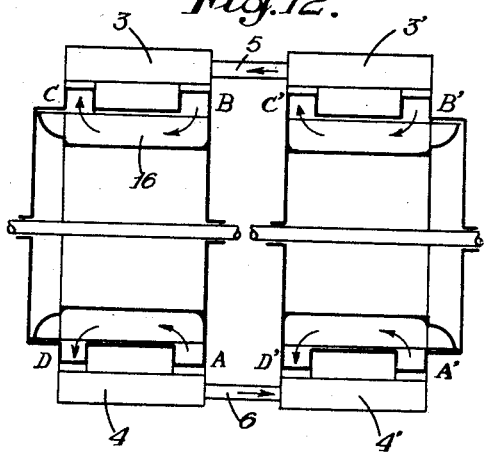
Fig. 12 is a diagrammatical section on line XII—XII of Fig. 11.

Fig. 12 shows such connections provided in 5 and 6 between two apparatus similar to that of Fig. 11 but here diagrammatically shown in diametral section. These apparatus illustrated by way of example are of the type in which the gaseous currents circulate in a direction parallel to the axis of rotation, but other types of apparatus may of course be used.

Figure 13:
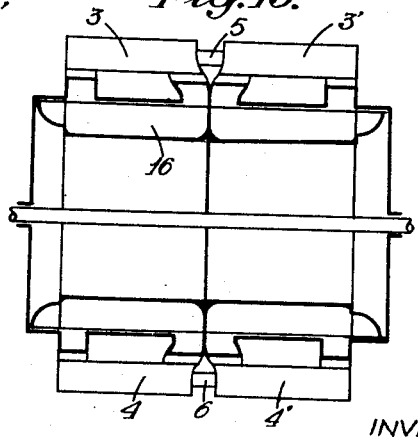
Fig. 13 is a sectional view similar to Fig. 12 but showing a modification.

The two apparatus may be combined into a single rotor having a double ring of chambers as shown in Fig. 13. The complete cycle is then carried out by means of a single rotary apparatus and of heat exchangers.

The rotary apparatus described is particularly suitable for the purpose of economically carrying out the cycle according to the invention, but it must be pointed out that any suitable compressors and pressure reducers can be used, and that the operation of any of the embodiments of the invention is independent of the type of apparatus chosen for carrying out the stages which constitute the cycle.

I claim:

1. In a process of performing thermal conversions, simultaneously performing on separate quantities of gas two series of operations comprising each a compression, an expansion and at least one heat-exchange, conducting said series of operations in such manner that one gives rise to a variation in gas volume which absorbs energy in the form of heat from gas under increased or reduced pressure and the other gives rise to a variation in gas volume which delivers energy in the form of heat to gas under increased or reduced pressure, and effecting between said two series of operations a direct transmission of energy by transfer of gas under increased or reduced pressure, without conversion into mechanical energy of the energy contained in the gas transferred.

2. In a process of performing thermal conversions, simultaneously performing on separate quantities of gas in separate circuits two series of operations comprising each a compression, an expansion and at least one heat-exchange, conducting said series of operations so that they give rise to opposite variations in gas volume, one of said series of operations absorbing energy in the form of heat, and the other delivering energy in the form of heat to gas under increased or decreased pressure, and connecting said circuits so as to create between them a flow of gas adapted automatically to compensate the variations in volume to which the gases circulating in the two circuits are subjected.

3. In a process of performing conversions of thermal energy, simultaneously performing on a gas in an output circuit a series of operations comprising compression followed by heating under constant pressure, expansion and cooling, and on a gas in an input circuit a series of operations comprising compression followed by cooling under constant pressure, expansion and heating, providing connections between said circuits so as to cause a flow of gas at the pressure obtaining after compression to take place from said output circuit to said input circuit, and a flow of gas at the pressure obtaining after expansion to take place from said input circuit to said output circuit, in order to compensate the decrease in volume due to cooling in one circuit by utilizing the increase in volume due to heating in the other circuit.

4. A process of performing thermal conversions as claimed in claim 3, wherein the difference of pressure maintained in the output circuit, is greater than the difference of pressure in the input circuit and use is made of the resulting pressure difference for the purpose of producing mechanical energy.

5. A process as claimed in claim 3, wherein the operations of compression and expansion are performed adiabatically in the output circuit whereas in the input circuit said operations are performed so as to be nearly isothermal.

6. In a process as claimed in claim 3, performing the operations of compression and expansion adiabatically in the circuit where energy is delivered (output circuit), performing successive stages of compression and successive stages of expansion isothermally in the circuit where energy is absorbed (input circuit), said successive compression stages and said successive expansion stages being separated from each other by heat exchanges.

7. A process as claimed in claim 3, wherein the two series of operations are carried out by expanding the gases from atmospheric pressure thus avoiding any inflow of gases from the output circuit into the input circuit.

8. In a process as claimed in claim 3, carrying out the series of operations by expanding atmospheric air from atmospheric pressure in the input portion of the cycle, expanding waste combustion gases from atmospheric pressure in the output portion of the cycle, and avoiding any inflow of gases from the output portion into the input portion of the cycle.

9. A process as claimed in claim 3, wherein the compressions and expansions of the two series of operations are carried out in rotary apparatuses providing a direct transfer of pressure from the expanding gas to the gas undergoing compression.

10. Apparatus for performing thermal conversions comprising two adjacent circuits including each a compressor, a pressure reducer and at least one heat exchanger, said apparatus being adapted to carry out reverse series of operations in the two circuits, one of said series absorbing and the other delivering potential energy in the form of gas under increased or reduced pressure, a connection being provided between the two circuits at points where the temperatures are substantially the same.

11. Apparatus as claimed in claim 10, wherein the circuit which absorbs energy, i. e. the input circuit, is connected to a point at a higher pressure in the circuit which delivers energy i. e. the output circuit, through an apparatus adapted to convert the pressure drop into mechanical energy.

12. Apparatus as claimed in claim 10, wherein the circuit which absorbs energy, i. e. the input circuit, comprises at least two compressors in series separated from each other by at least one heat-exchanger, at least two pressure reducers in series separated from each other by at least one heat-exchanger, and at least one connection for the gas volume exchange between the heat exchangers on the compression side and the corresponding heat exchangers on the expansion side.

13. Apparatus as claimed in claim 10, wherein the input circuit starts from the atmosphere wherefrom air is withdrawn by a pressure reducer, to be sent into a heat exchanger, then compressed and restored to the atmosphere at a higher temperature, and wherein the output circuit starts from a flue or chamber containing combustion gases or other waste gases at a temperature above atmospheric, which are withdrawn therefrom by a pressure reducer whence they are circulated through a heat exchanger and thereafter in a compressor which discharges them into the atmosphere at a temperature under their initial temperature, a connection being provided between said two circuits near their heat exchangers.

14. Apparatus as claimed in claim 10, wherein each of the two interconnected circuits comprises a rotary apparatus having a ring of chambers and a distributor arranged so as to control in succession during the course of a revolution, the compression of the gas, its discharge and replacement by gas at a different temperature, the expansion of said gas and finally its replacement by gas to be compressed; the expanding gas acting directly on the gas undergoing compression, and the connection between the two circuits being such that the variations in gaseous volumes due to temperature changes in the two circuits will be mutually compensated.

15. Apparatus as claimed in claim 10, wherein the compressors and the pressure reducers are in the form of a rotary apparatus having a single rotor comprising two rings of chambers (i. e. one for each circuit) and a distributor for each of said rings of chambers arranged to control said series of operations, a connection being provided between the heat exchangers of both circuits.

16. Apparatus for performing thermal conversions comprising two adjacent circuits including each a compressor, a pressure reducer, and two heat exchangers, said apparatus being adapted to carry out reverse series of operations in the two circuits, comprising compressing the gases in the two circuits, the exchange of heat therebetween, expansion of the gases in the two circuits, and a reverse exchange of heat therebetween, one of said circuits absorbing and the other delivering potential energy in the form of gas under increased or reduced pressure, and connecting passageways between the two circuits at points adjacent said heat exchangers.

17. Apparatus for performing thermal conversions comprising two adjacent circuits including each a compressor, a pressure reducer, and two heat exchangers separated by said compressor and said pressure reducer, said apparatus being adapted to carry out reverse series of operations in the two circuits, comprising compressing the gases in the two circuits, the exchange of heat therebetween, expansion of the gases in the two circuits, and a reverse exchange of heat therebetween, one of said series absorbing and the other delivering potential energy in the form of gas under increased or reduced pressure, and connecting passageways between the two circuits at points where the temperatures and pressures are substantially the same.

18. Apparatus for performing thermal conversions comprising two adjacent circuits including each a compressor, a pressure reducer, and two heat exchangers on opposite sides of said compressor, said apparatus being adapted to carry out reverse series of operations in the two circuits, one of said series absorbing and the other delivering potential energy in the form of heat exchanged between the gases in the two circuits under increased or reduced pressure, and connecting passageways between the two circuits at points on corresponding sides of said two compressors.

19. Apparatus for performing thermal conversions comprising two adjacent circuits including each a compressor, a pressure reducer, and two heat exchangers on opposite sides of said compressor, one of said heat exchangers operating at a substantially constant high pressure and the other of said heat exchangers operating at a substantially constant low pressure, said apparatus being adapted to carry out reverse series of operations in the two circuits, one of said series absorbing and the other delivering potential energy in the form of heat exchanged between the gases in the two circuits under increased or reduced pressure, and connecting passageways between the two circuits at points adjacent corresponding heat exchangers where the temperatures are substantially the same.

20. A process for producing heat and cold, characterized by simultaneously performing on a gas in a circuit, a series of operations comprising compression, heating at constant pressure by means of a source of heat at relatively high temperature, expansion and cooling at constant pressure, and upon a gas in another circuit a series of operations comprising compression, cooling at constant pressure, expansion and heating at constant pressure at the expense of the surrounding medium, utilizing the energy freed by the expansion of said gases to effect their compression, said circuits being connected with each other at points at substantially equal temperatures both before and after compression to compensate for opposed variations in volume of the gases in both circuits, whereby the heat supplied by said source is utilized to yield both cold and an amount of heat greater, but at lower temperature, than the amount of heat supplied by said source.

21. A process for producing heat and cold, characterized by simultaneously performing a series of operations on an input circuit and on an output circuit of gas, whereby the gas in the output circuit is first heated at constant pressure by means of a source of heat at relatively high temperature, expanded and cooled at constant pressure, and whereby the gas in the input circuit is first cooled at constant pressure, expanded and heated at constant pressure at the expense of the surrounding medium, utilizing the energy freed by the expansion of said gases to effect their compression, said circuits being connected with each other at points at substantially equal temperatures both before and after compression to compensate for opposed variations in volume of the gases in both circuits.

ALBERT FRANÇOIS LÈBRE.